(12) United States Patent
Cieslinski

(10) Patent No.: US 8,264,578 B2
(45) Date of Patent: Sep. 11, 2012

(54) IMAGE SENSOR WITH SELECTABLE AMPLIFICATION FACTORS

(75) Inventor: Michael Cieslinski, Ottobrunn (DE)

(73) Assignee: Arnold & Richter Cine Technik GmbH & Co. Betriebs KG (DE)

( * ) Notice: Subject to any disclaimer, the term of this patent is extended or adjusted under 35 U.S.C. 154(b) by 383 days.

(21) Appl. No.: 12/683,254

(22) Filed: Jan. 6, 2010

(65) Prior Publication Data

US 2010/0177225 A1 Jul. 15, 2010

(30) Foreign Application Priority Data

Jan. 9, 2009 (DE) .......................... 10 2009 004 187

(51) Int. Cl.
*H04N 5/235* (2006.01)
*H04N 3/14* (2006.01)
*H04N 5/335* (2006.01)

(52) U.S. Cl. .................................... 348/300; 348/229.1

(58) Field of Classification Search ............... 348/222.1, 348/223.1, 229.1, 230.1, 300, 301
See application file for complete search history.

(56) References Cited

U.S. PATENT DOCUMENTS

| | | | |
|---|---|---|---|
| 5,396,288 A * | 3/1995 | Tsugita et al. ............. | 348/229.1 |
| 7,297,917 B2 | 11/2007 | Olsen et al. | |
| 7,440,017 B2 * | 10/2008 | Endo et al. ................ | 348/308 |
| 7,460,164 B2 * | 12/2008 | Hyama et al. ............. | 348/300 |
| 7,643,077 B2 * | 1/2010 | Endo et al. ................ | 348/308 |
| 7,812,876 B2 * | 10/2010 | Hiyama et al. ............. | 348/300 |
| 8,045,031 B2 * | 10/2011 | Cieslinski ................. | 348/308 |
| 2001/0012070 A1 * | 8/2001 | Enod et al. ............... | 348/302 |
| 2005/0052554 A1 | 3/2005 | Sakurai et al. | |
| 2005/0168602 A1 | 8/2005 | Sumi et al. | |

(Continued)

FOREIGN PATENT DOCUMENTS

EP 1681850 A1 7/2006

(Continued)

OTHER PUBLICATIONS

German Search Report, relating to German Patent Application No. 10 2009 004 187.7, dated Jun. 30, 2009 with English Translation.

*Primary Examiner* — Nicholas Giles
(74) *Attorney, Agent, or Firm* — Amster, Rothstein & Ebenstein LLP

(57) ABSTRACT

The invention relates to an image sensor for electronic cameras, having a plurality of light-sensitive pixels for the generation of at least one signal proportional to exposure, wherein the pixels are coupled to a read-out circuit having at least one amplifier and configured to amplify the at least one signal of a respective pixel with different amplification factors to generate differently amplified signals for the at least one signal of a respective pixel, wherein the read-out circuit has at least one output to output at least some of the differently amplified signals as output signals. At least three different amplification factors can be selected for the at least one signal of a respective pixel, wherein the read-out circuit includes a selection device which is configured to select those amplification factors in dependence on the level of the at least one signal of a respective pixel with which the output signals of the read-out circuit are amplified, wherein the number of output signals for the at least one signal of a respective pixel amounts to at least two and is less than the number of the selectable amplification factors.

19 Claims, 8 Drawing Sheets

U.S. PATENT DOCUMENTS

| | | | |
|---|---|---|---|
| 2008/0174672 A1* | 7/2008 | Hiyama et al. | 348/222.1 |
| 2008/0218619 A1 | 9/2008 | Egawa | |
| 2008/0266434 A1* | 10/2008 | Sugawa et al. | 348/308 |
| 2008/0309809 A1* | 12/2008 | Cieslinski | 348/308 |
| 2011/0102654 A1* | 5/2011 | Hiyama et al. | 348/300 |

FOREIGN PATENT DOCUMENTS

| | | |
|---|---|---|
| EP | 1705903 A1 | 9/2006 |
| WO | WO0237830 A2 | 5/2002 |

* cited by examiner

IMAGE SENSOR WITH SELECTABLE AMPLIFICATION FACTORS

FIELD OF THE INVENTION

The present invention relates to an image sensor for electronic cameras, in particular digital cine cameras, having a plurality of light-sensitive pixels for the generation of at least one signal proportional to exposure.

BACKGROUND OF THE INVENTION

Known electronic cameras typically use an image sensor in CMOS or CCD technology which includes a plurality of light-sensitive elements—so-called pixels—which are in particular arranged in rows and columns and which convert light incident through an objective of the camera into electrical signals. This signals can, for example, be charges, currents or voltages—in particular in dependence on the technology used and/or on the processing stage on the image sensor. A respective signal is in this respect proportional to a charge of the respective pixel collected by an exposure.

A read-out circuit, which is usually arranged at the edge of the image field of the image sensor formed by the pixels, receives the signals of the pixels for further processing. In the further processing, the signals of the pixels are usually converted into electrical voltages and subsequently amplified. The amplified signals can then be output by one or more outputs of the image sensor in analog form or digitized using one or more internal analog-to-digital converters and output in digital form.

Known image sensors, however, have a comparatively small dynamic range. Electronic cameras thus only have an intrascene dynamic range of 1:1000, whereas a chemical film can have an intrascene dynamic range of 1:50,000 and more.

To increase the intrascene dynamic range of electronic image sensors, it is known to take a plurality of single images with different exposure times for each image and subsequently to compose the individual images. Since the plurality of individual images are taken sequentially in this process and thus at different times and since the sensor has to be read out in each case between them, spatial falsification effects can arise in moved motifs. for example, reflections of a light source frequently occur in a person's eye. Due to the movement of the person and to the different taking times, the position of such a reflection then moves and can, in an extreme case, even lie outside the eye. Such an image fault is very irritating for a human viewer since the shape of objects is estimated with reference to the position of such highlights.

In addition, it is also known for the increase of the dynamic range of an image sensor to couple the pixels to a read-out circuit having at least one amplifier, said read-out circuit being configured to amplify the at least one signal of a respective pixel with different amplification factors to generate differently amplified signals for the at least one signal of a respective pixel. This is achieved in the prior art in that the read-out circuit for a respective pixel, in particular for a respective column, includes two channels which are separate from one another and have a respective amplifier each to amplify the at least one signal of a respective pixel, with the two channels associated with a respective pixel having different amplifications. One of the two channels can be optimized to high input signals. This can be achieved, for example, by especially modified pixels with capacitances which can be added, such as are generally described in US 2005/0052554 A1, or by pixels with overflow capacitance values, such as are generally described in EP 1 681 850 A1. Additionally or alternatively, the other or one of the two channels can be optimized to a high sensitivity or to a low noise. This can be achieved, for example, by a fixed preamplification. In both cases, a plurality of signals are generated from a charge generated during a single exposure process in a respective pixel so that differently high signals of the respective pixel, which are, however, based on one and the same charge signal, already underlie the different amplifications in the two channels. It is, however, generally sufficient that two channels with different amplifications are present.

The two channels can then be read out and combined independently of one another, with an image with a higher dynamic range arising overall.

This is shown in FIGS. 1a and 1b. The combination of the amplified signals of two channels, of which one channel 101 has a high amplification and one channel 103 has a low amplification, takes place such that, with a short exposure, the amplified signal of the channel 101 with the high amplification underlies an output value 105 for the respective picture element associated with the two channels 101, 103 and, with a long exposure, the amplified signal of the channel 103 with the low amplification underlies an output value 105 for the respective picture element associated with the two channels 101, 103. The combination of the amplified signals preferably takes place after a digitizing of the amplified signals. Further preferably, the respective pixel and/or each of the two channels 101, 103 has an at least substantially linear exposure-signal characteristic as is shown in FIG. 1a. To the extent that the analog signals of the pixels do not vary linearly with the exposure, this can be balanced via a corresponding calibration in the digitizing.

At the transition between short and long exposure, a simple switchover between the two channels 101, 103 is as a rule not sufficient since, due to the usually unavoidable occurrence of offset voltages, deviations from the desired amplifications and/or drifts at the transition which are manufacture induces, a jump 107 in the exposure-output value characteristic would occur such as is shown in FIG. 1b. This results in visible image interference in areas in the image with constantly increasing brightness, for example under a cloudless sky, if the transition is actually in such a surface.

A cross-fading therefore usually occurs in a transition region 109 around the transition by which both the amplified signal of the channel 101 with the high amplification and the amplified signal of the channel 103 with the low amplification are taken into account, with the two amplified signals being offset with respect to one another such that a gentle transition arises such as is shown in the enlarged representation of the transition in FIG. 1b.

To further reduce the noise in the channel 101 with the high amplification and thus to further increase the dynamic range of the image sensor, the amplification of this channel could be further increased, but then the transition or the transition region 109 at which a switch or cross-fade is made from the channel 101 driven at at least almost full level there to the channel 103 with only driven at a low level there would be displaced to even shorter exposures. However, at these even shorter exposures, the signal quality of the channel 103 with the low amplification is reduced since this channel only has a very small signal there which is only slightly above the noise level of the respective pixel. The image quality would suffer accordingly.

To solve this problem, a third channel would therefore have to be provided which has a middle amplification and, when the channel 101 having the high gain is driven at full level, a sufficiently high signal quality.

The provision of such a third channel, however, leads to a substantially increased construction effort and to higher costs since corresponding means thus also become necessary for the evaluation, analog-to-digital conversion, calibration and/or cross-fading of the third channel to and/or outside the image sensor.

SUMMARY OF THE INVENTION

It is the underlying object of the invention to provide an image sensor of the initially named kind which has an increased dynamic range with respect to known image sensors without causing a substantially increased construction effort or substantially higher costs.

The object is satisfied by an image sensor having the features of claim 1 and in particular in that at least three different amplification factors can be selected for the at least one signal of a respective pixel, with the read-out circuit including a selection device which is configured to select those amplification factors with which the output signals of the read-out circuit are amplified in dependence on the level of the at least one signal of a respective pixel, and with the number of the output signals for the at least one signal of a respective pixel amounting to at least two and being less than the number of the selectable amplification factors. In other words, the number of the respectively selected amplification factors is smaller than the number of the amplification factors available for each selection.

For example, the generation of the differently amplified signals for the at least one signal of a respective pixel can take place at least in part in channels separate from one another using a respective amplifier, with the at least one output preferably including a number of channel outputs corresponding to the number of the selected amplification factors. For this reason, not the amplified signals of all channels are output at the channel outputs of the read-out circuit, but rather only those amplified signals which are also actually required in the further processing, in particular for the aforesaid cross-fading which usually takes place outside the image sensor. The additional effort and the additional costs for the realization of an image sensor with two channels or more than two channels with a total of at least three possible, different amplifications are therefore only slightly higher than with an image sensor with precisely two channels with a total of two, different amplifications.

In accordance with an embodiment of the invention, the read-out circuit is configured such that the amplified signal of at least one of the preferably at least three channels is always output at one of the channel outputs as one of the output signals. The output of the respective output signal of the respective channel can in this respect always take place via the same channel output.

The channels can have different sensitivities and/or linear exposure-signal characteristics, as was initially explained with respect to image sensors known from the prior art.

In addition, it is however, also possible, for example, that the generation of the differently amplified signals for the at least one signal of a respective pixel takes place at least partly in a common channel with a common amplifier of the least one amplifier, with the amplification factor of the common amplifier being adjustable, in particular switchable. Not all possible amplified signals are output at the common channel of the read-out circuit in this case either, but rather only those amplified signals which are required for the further processing. The effort and/or costs can even be lower for the realization of such an image sensor with optionally only one single channel than in the image sensor with two channels known from the prior art.

In particular in this case, the generation of the differently amplified signals for the at least one signal of a respective pixel can take place at least partly sequentially and/or the read-out circuit can be configured such that the generation of the differently amplified signals for the at least one signal of a respective pixel only takes place for some of the selectable amplification factors.

The read-out circuit can generally be configured such that the amplification factor is always selected with the middle amplification with an image sensor which selects precisely two amplification factors from precisely three selectable amplification factors for the at least one signal of a respective pixel, namely from an amplification factor with a low amplification, an amplification factor with a middle amplification and an amplification factor with a high amplification. The read-out circuit then only determines which of the two other amplification factors is additionally selected.

Such a selection should consequently also be understood under the feature that the selection device is configured to select those amplification factors in dependence on the level of the at least one signal of a respective pixel which underlie those amplified signals which are output at the least one output of the read-out circuit in which one or more amplification factors are always selected for the at least one signal of a respective pixel, in particular one or more channels are always output at a respective one of the channel outputs, are in particular fixedly associated with a respective channel output, The composition of a group of amplification factors which underlie the amplified signals which are output at the least one output is therefore selected by the selection device for the at least one signal of a respective pixel, with the number of the amplification factors of the group corresponding to the number of the output signals. In other words, the aforesaid features also includes a selection in which a selection can only be made from some of the amplification factors associated with a respective signal for the at least one signal of a respective pixel, in particular since some of the output signals are already fixed by one or more fixedly associated, preselected or otherwise determined amplification factors.

A particularly cost-effective image sensor can in particular be obtained when the image sensor includes a plurality of analog-to-digital converters for the digitizing off the output signals output at the at least one output, with the selection device including adjustment means, in particular switch means, which are arranged between the at least one amplifier and the analog-to-digital converter, i.e. when the analog-to-digital conversion has already been carried out on the image sensor. The analog-to-digital conversion then does not have to be carried out for all amplification factors. The analog-to-digital converter can, however, generally also be provided outside the image sensor. In both cases, the image sensor preferably includes a plurality of output amplifiers, with the adjustment means being arranged between the at least one amplifier and the output amplifiers.

The selection device is preferably configured to carry out the selection in dependence on at least one comparison between at least one reference value and the level of the at least one signal of the respective pixel, in particular after its amplification by means of one of the at least one amplifier. For example, the selection device can include for this purpose for each pixel, in particular for each column, at least one comparator, in particular precisely one comparator, and at least one adjustment means, in particular a switch, in particular precisely one adjustment means.

In an image sensor which selects precisely two amplification factors from precisely three selectable amplification factors for the at least one signal of a respective pixel, it is preferred if the selection device is configured so that the amplified signal which the amplification with the aforesaid middle amplification underlies or the still unamplified signal is compared with the aforesaid reference value, with the amplified signal which the amplification factor with the aforesaid low amplification underlies additionally being selected if the comparison shows that the amplified signal which the amplification factor with the middle amplification underlies or the still unamplified signal is above the reference value, and with the amplified signal which the amplification factor with the aforesaid high amplification underlies, being additionally selected if the comparison shows that the amplified signal which the amplification with the middle amplification underlies or the still unamplified signal is below the reference value. That signal is to be understood by the unamplified signal which is applied to the single channel or multi-channel amplification device which has the selectable amplification factors.

Alternatively, the selection device can be configured so that the amplified signal which the amplification factor with the low amplification underlies is compared with the reference value, with the amplified signal which the amplification factor with the middle amplification underlies additionally being selected if the comparison shows that the amplified signal which the amplification factor with the low amplification underlies is above the aforesaid reference value, and with the amplified signal which the amplification factor with the high amplification underlies additionally being selected if the comparison shows that the amplified signal which the amplification factor with the low amplification underlies is below the reference value. The reference value of the alternative embodiment is preferably in the range of the upper limit of the dynamic range of the channel with the high amplification. Alternatively to this, however, the amplified signal which the amplification factor with the high amplification underlies can also be compared with the reference value to select an output signal in an analog manner to the procedure explained above.

With an image sensor which selects precisely two amplification factors from precisely three selectable amplification factors for the at least one signal of a respective pixel, no additional output is necessary as a rule at which the result of the selection of the selection device is output if the amplified signal which the amplification factor with the middle amplification underlies is always output at the same output provided that channels separate from one another are present or is always output first or second provided a common channel is present. For then the comparison of the amplified signal which the amplification factor with the middle amplification underlies with the reference value can again take place outside the image sensor to determine which of the two other amplification factors has additionally been selected. With an image sensor which, for example, includes precisely two channel outputs and precisely four channels K1 to K4, with the amplification increasingly constantly from channel K1 toward channel K4, the selection device can be made to select either the amplified signals of the channels K1 and K2, the amplified signals of the channels K2 and K3 or the amplified signals of the channels K3 and K4 for the output at the two channel outputs. It is advantageous in this case to communicate the result of the selection of the selection device to the following signal processing, in particular present outside the image sensor. This also applies when a common channel and four selectable amplification factors are present and two output signals are output sequentially. It becomes clear from this example that it may be of advantage if the read-out circuit includes at least one additional output for the at least one signal of a respective pixel, in particular for every column, with the result of the respective selection for the at least one signal of a respective pixel, in particular of a respective column, being able to be output at the at least one additional output.

In accordance with another embodiment of the invention, the selection device is configures such that the output signals have amplification factors which follow one another directly in a row formed from the selected amplification factors in an increasing order. In other words, the selection device is made only to select those combinations of amplification factors which have amplifications located next to one another. In the aforesaid example of the image sensor with precisely two channel outputs and precisely four channels, only the channel pairs K1 and K2, K2 and K3 or K3 and K4 adjacent to one another with respect to their amplification factors are therefore output. The selection device of an image sensor with two channel outputs and four channels for the at least one signal of a respective pixel, in particular for each column, preferably includes two comparators and two switches.

The image sensors in accordance with the invention can generally also be configured such that more than two amplification factors are selected. This can in particular be meaningful if the amplified signals of more than two output signals with different amplifications should be taken into account on a cross-fade. Image sensors are furthermore also conceivable which output more than four output signals for the at least one signal of a respective pixel.

The invention furthermore relates to a method for the reading out of an image sensor for electronic cameras, wherein the image sensor includes a plurality of light-sensitive pixels for the generation of at least one signal proportional to exposure, with the pixels being coupled to a read-out circuit having at least one amplifier, with the at least one signal of a respective pixel being amplified with different amplification factors to generate differently amplified signals for the at least one signal of a respective pixel, with the read-out circuit having at least one output to output at least some of the differently amplified signals as output signals. At least three different amplification factors can be selected for the at least one signal of a respective pixel, with those amplification factors being selected in dependence on the level of the at least one signal of a respective pixel with which the output signals of the read-out circuit are amplified and with the number of output signals for the at least one signal of a respective pixel amounting to at least two and being less than the number of the amplification factors which can be selected.

Further developments of the method in accordance with the invention result in an analog manner from the explained further developments of the image sensor in accordance with the invention.

Advantageous embodiments of the invention are also set forth in the dependent claims, in the description and in the drawing.

BRIEF DESCRIPTION OF THE DRAWINGS

The invention will be described in the following by way of example with reference to the drawing. There are shown in a schematic representation in each case:

FIG. 1b a combined exposure-output value characteristic of the image sensor in accordance with FIG. 1a;

DETAILED DESCRIPTION OF THE EMBODIMENTS OF THE INVENTION

Figure 2:
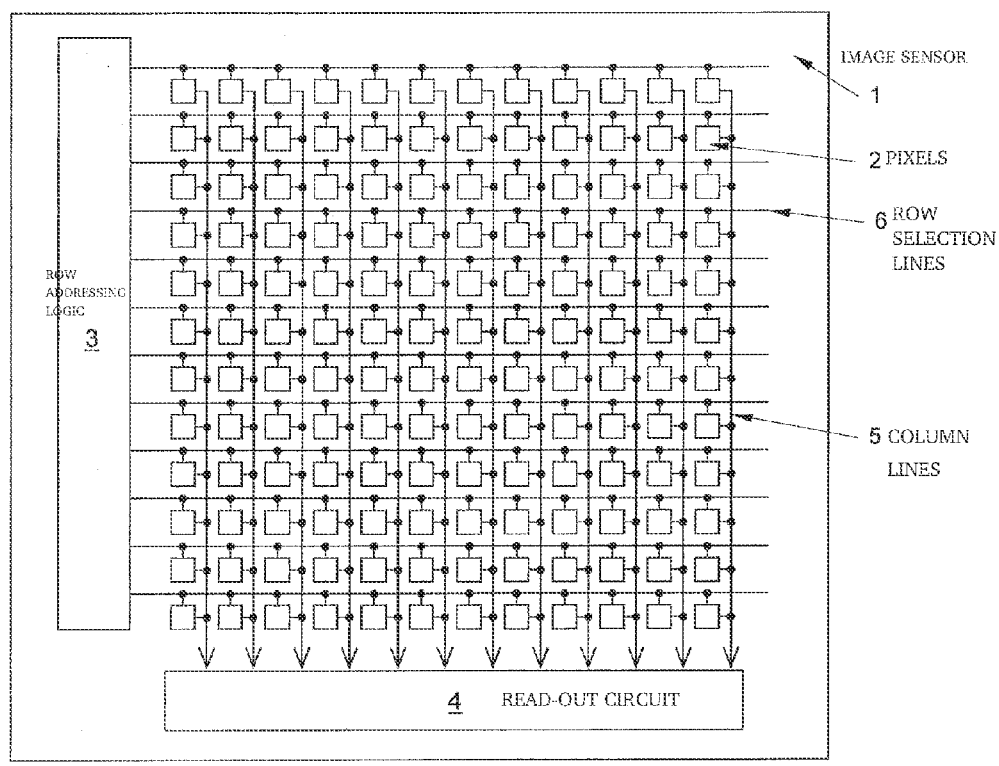
FIG. 2 a schematic diagram of the major function groups of a CMOS image sensor with a read-out circuit.

The schematic diagram of a CMOS area sensor is shown in FIG. 2. The reading out of the image sensor 1 shown in FIG. 2 takes place row-wise, i.e. row for row. For this purpose, pixels 2 of a respective row are connected to column lines 5 by means of a respective row selection line 6. The pixels 2 are coupled to a read-out circuit 4 to amplify the signals of the pixels 2 of the selected row applied to the column lines 5. The amplified signals are then guided via a multiplex device to outputs of the image sensor. Furthermore, a row addressing logic 3 can be recognized to address the row selection line 6 associated with the respective row to be read out. For reasons of illustration, only a 12×12 pixel field is shown in FIG. 2. The number of the rows and columns of an image sensor used in practice will generally be substantially higher. For example, the image sensors can have a resolution of 3018×2200 pixels. With a CMOS row sensor, however, only one single row of pixels is present which is, however, read out more frequently.

Figure 3A:
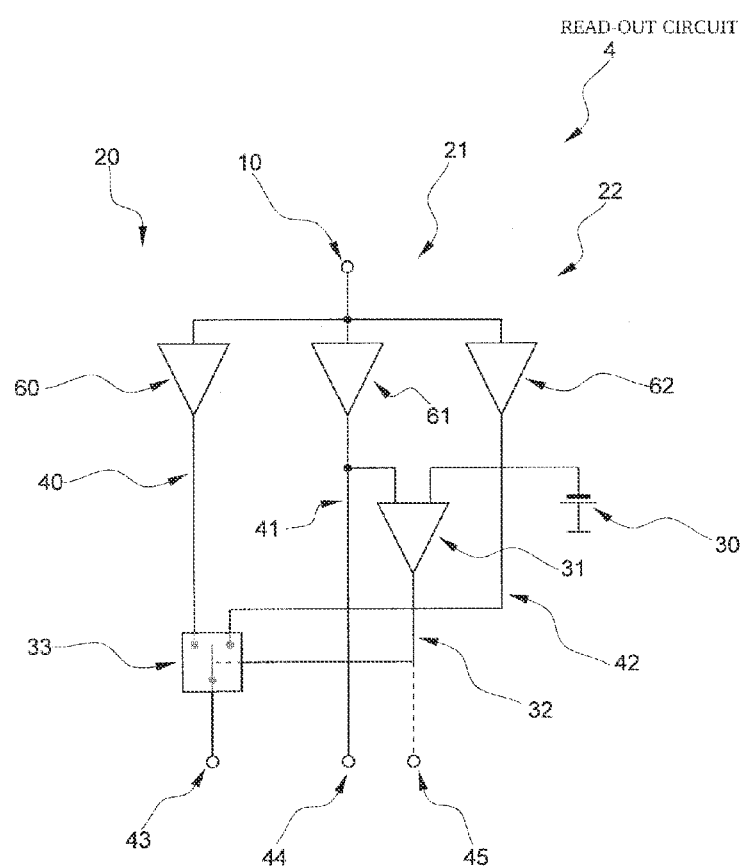
FIG. 3a a first embodiment of a read-out circuit in accordance with the invention.

The read-out circuit 4 from FIG. 2 in accordance with a first embodiment of the image sensor in accordance with the invention is shown in FIG. 3a. The read-out circuit 4 includes three channels 20, 21, 22 for each column which are separate from one another, are independent of one another and each have a column amplifier 60, 61, 62. The column amplifiers 60, 61, 62 of the channels 20, 21, 22 have different amplifications, i.e. different amplification factors, so that the signal of a pixel of the respective column applied to a common input 10 is amplified with different strengths in the channels 20, 21, 22. Amplified signals which differ from one another are therefore present at the outputs 40, 41, 42 of the column amplifiers 60, 61, 62 of the channels 20, 21, 22. In the example shown, the column amplifier 60 of the channel 20 has a high amplification, the column amplifier 61 of the channel 21 a middle amplification and the column amplifier 62 of the channel 22 a low amplification.

However, only two channel outputs 43, 44 are associated with the three channels 20, 21, 22. Provision is made in this respect that the amplified signal of the column amplifier 61 of the channel 21 (with the middle amplification) is fixedly associated with the channel output 44, i.e. the amplified signal of the column amplifier 61 of the channel 21 is always output at the one channel output 44 as an output signal.

The read-out circuit 4 furthermore includes a selection device which includes a comparator 31 for each column which compares the level of the amplified signal of the column amplifier 61 of the channel 21 with a reference value 30. The selection device furthermore includes a switch 33 which selects whether the amplified signal of the column amplifier 60 of the channel 20 or the amplified signal of the column amplifier 62 of the channel 22 should be connected as a further output signal to the other channel output 43 in dependence on the comparison between the level of the amplified signal of the column amplifier 61 of the channel 21 with the reference value 30. For this purpose, the result of the comparison is transmitted from an output 32 of the comparator 31 to the switch 33.

If the comparison shows that the amplified signal of the column amplifier 61 of the channel 21 is above the reference value 30, the amplified signal of the column amplifier 62 of the channel 22 (with the low amplification) is output at the other channel output 43. If, in contrast, the comparison shows that the amplified signal of the column amplifier 61 of the channel 21 is below the reference value 30, the amplified signal of the column amplifier 60 of the channel 20 (with the high amplification) is output at the other channel output 43.

Figure 1A:
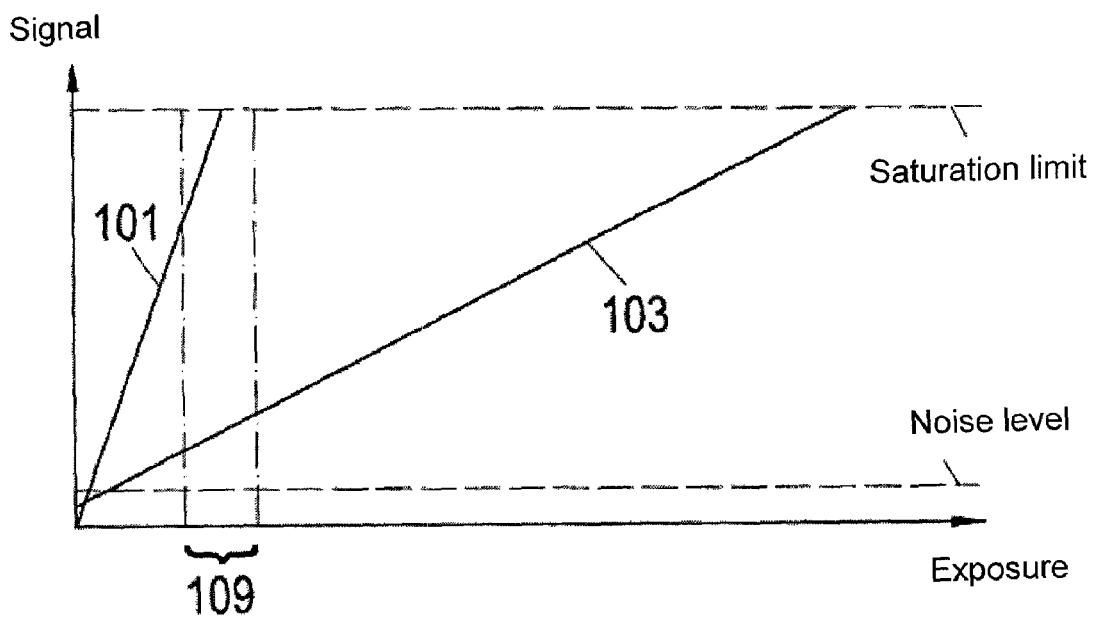
FIG. 1a exposure-signal characteristics of an image sensor known from the prior art with two channels with different amplifications.
Figure 1B:
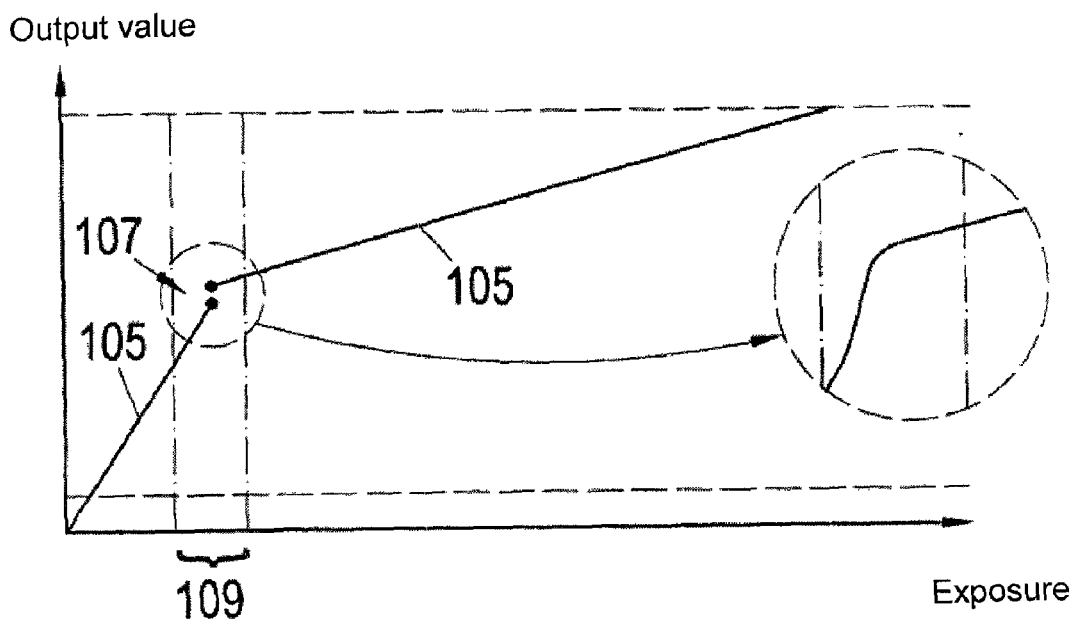

With the three channels 20, 21, 22, the exposure-output characteristic described in connection with FIG. 1 has two transition regions in which cross-fading in each case takes place, namely between the channels 20 and 21 and between the channels 21 and 22. The aforesaid selection device in this respect ensures that the amplified signals of the column amplifiers 60, 61 of the channels 20 and 21 are applied to the channel outputs 43, 44 when a cross-fading is required in the transition region between the channels 20 and 21 and that the amplified signals of the column amplifiers 62, 61 of the channels 22 and 21 are applied to the channel outputs 43, 44 when a cross-fading is required in the transition region between the channels 21 and 22. Since a plurality of transition regions are thus present for a cross-fading between different channels, the channels 20, 21, 22 can be better noise-optimized. It can in particular hereby be avoided that a channel which has a low amplification is operated in a lower dynamic range. This is of advantage since the signal-to-noise ratio is generally comparatively poor in the lower dynamic range of a column amplifier.

The information whether the amplified signal applied to the channel output 43 is the amplified signal of the column amplifier 60 of the channel 20 or the amplified signal of the column amplifier 62 of the channel 22 can be reconstructed outside the image sensor by a comparison corresponding to the aforesaid comparison so that this information does not have to be output by the read-out circuit 4. Optionally, however, an additional output 45 can be provided for this purpose.

Figure 3B:
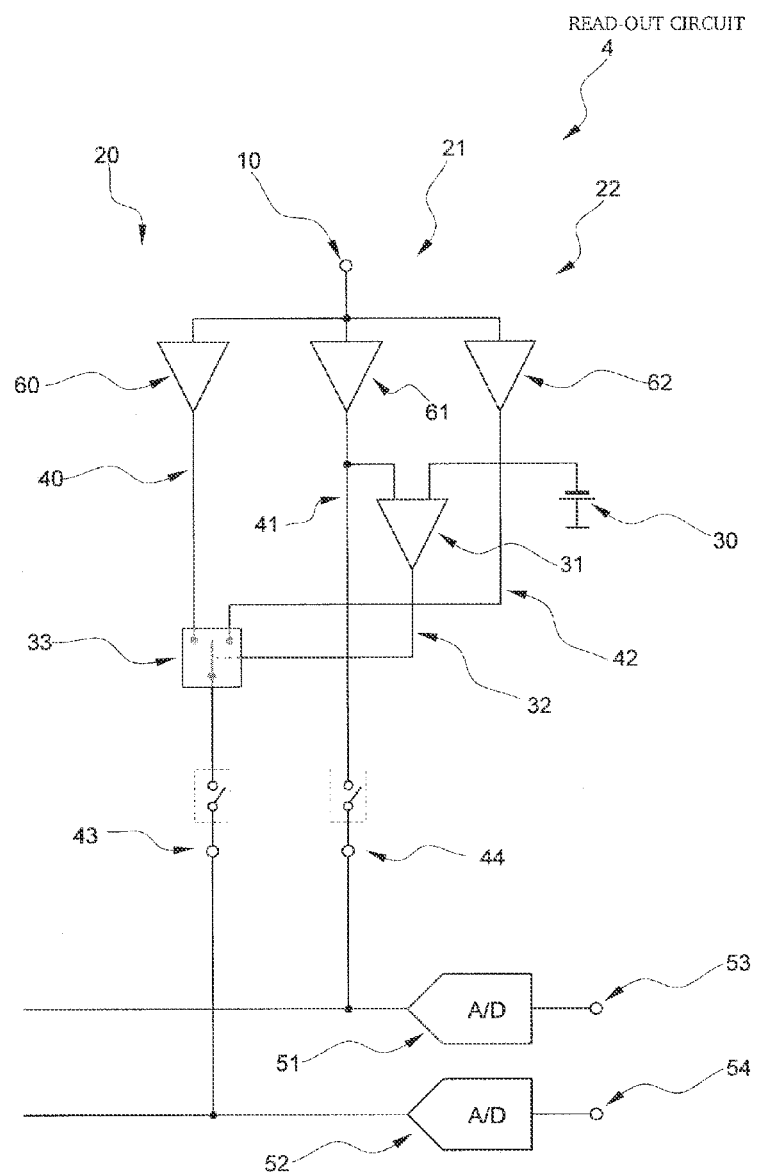
FIG. 3b the read-out circuit in accordance with the invention from FIG. 3a with downstream analog-to-digital conversion.

With respect to FIG. 3a a signal bus is additionally shown in FIG. 3b with which the channel outputs 43, 44 of all columns are coupled via switches which belong to a multiplex device to switch the channel outputs 43, 44 of the individual columns sequentially to the signal bus. The signal bus shown includes two signal lines, with the channel output 43 being coupled to the one signal line and the channel output 44 being coupled to the other signal line. The two signal lines end in image sensor outputs 53, 54 at which the amplified signals are output which were previously digitized by means of a respective analog-to-digital converter 51, 52 and were output by the channel outputs 43, 44. Each signal line of the signal bus is preferably still provided with an output amplifier, not shown, to further amplify the amplified signals output by the channel outputs 43, 44, with the respective output amplifier being arranged directly before the respective analog-to-digital converter 51, 52 in the signal direction.

Figure 3C:
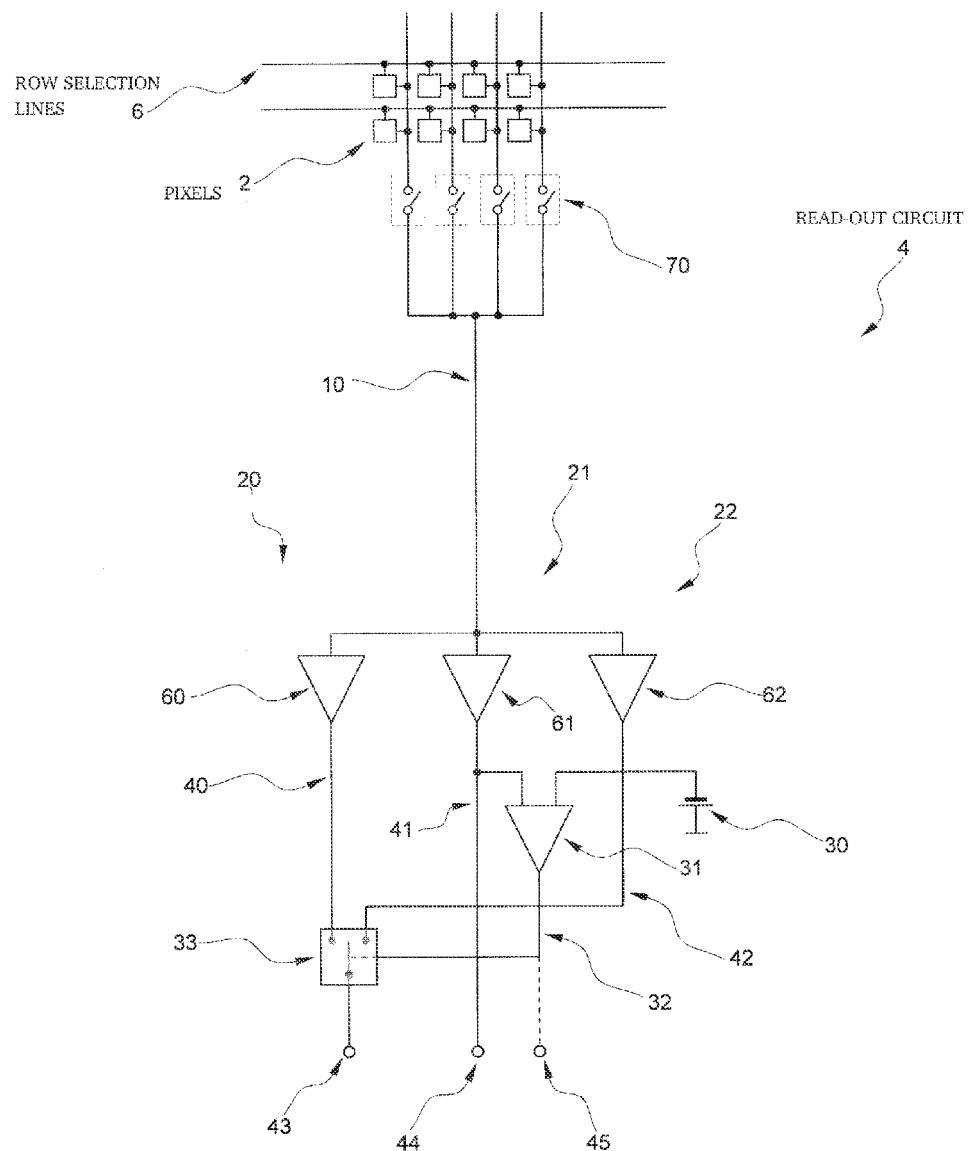
FIG. 3c the read-out circuit from FIG. 3a with upstream multiplexer.

With respect to FIG. 3a, a multiplexer connected upstream of the read-out circuit 4 and having switches 70 is additionally shown in FIG. 3c, said multiplexer switching the signals of the pixels 2 of a plurality of columns sequentially in time to the three channels 20, 21, 22. A plurality of columns, for example, two or four respective columns, share a common amplifier device. The amplifier device sequentially works through the associated columns in the time multiplex, with it being possible that the pixels of a row of the associated columns are already read out sequentially from the pixel field. A sample-and-hold circuit for the signals of the pixels of the columns connected upstream of the switches 70 is not shown in FIG. 3c. Such a multiplexer can generally also be used in the images sensors described in the following in accordance with FIGS. 4a, 4b and 5.

Figure 4A:
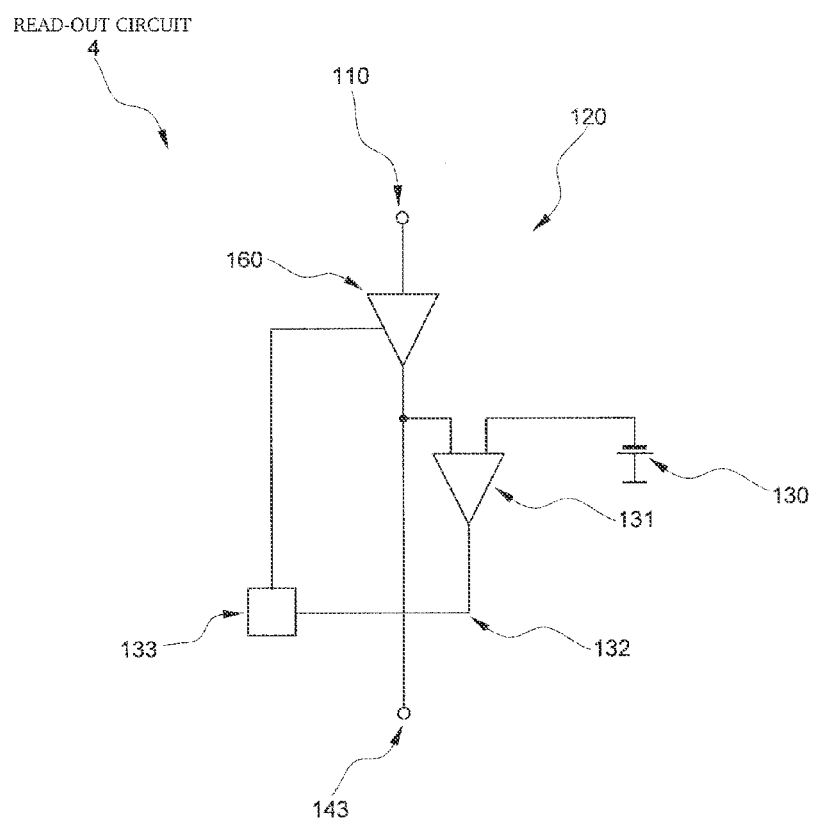
FIG. 4a a second embodiment of a read-out circuit in accordance with the invention.

A second embodiment of the image sensor in accordance with the invention is shown in FIG. 4a in which the read-out circuit 4 for each column only includes a single channel 120. The channel 120 includes a single column amplifier 160 with which the signal of a respective pixel applied to an input 110 can be amplified, with the amplification factor of the column amplifier 160 being adjustable or switchable. The signal applied to the input 110 can therefore be amplified a multiple of times after one another and with different amplification factors so that differently amplified signals can be generated from a signal of a respective pixel, as is also the case with the image sensors in accordance with FIGS. 3a and 3b.

The column amplifier 160 can, for example, be set to three mutually different amplification factors, i.e. to an amplification factor with a low amplification, to an amplification factor with a middle amplification and to an amplification factor with a high amplification. Generally, three differently amplified signals can therefore be generated by the column amplifier 160 from one signal of a respective pixel applied to the input 110 which thus correspond to the differently amplified signals from FIGS. 3a and 3b.

Since, however, only two differently amplified signals are required for a cross-fading such as described above, only the two differently amplified signals required for the respective cross-fading are also generated in the image sensor in accordance with FIG. 4a. The image sensor in accordance with FIG. 4a differs herein from the image sensors in accordance with FIGS. 3a and 3b in which that amplified signal is also generated which is ultimately not required for the respective cross-fading and is therefore not output by the read-out circuit 4.

In order only to generate the two amplified signals required for the respective cross-fading, the read-out circuit 4 in turn has a selection device which includes a reference value 130, a comparator 131 and an adjustment means 133. First, the column amplifier 160 is set to the amplification factor with the middle amplification to generate a correspondingly amplified signal with a middle amplification which is output at an output 143 of the read-out circuit 4 as an output signal.

At the same time, the level of the amplified signal with the middle amplification is compared by the comparator 131 with the reference value 130. If the comparison shows that the amplified signal with the middle amplification is above the reference value 130, the column amplifier 160 is switched to the low amplification factor to generate a correspondingly amplified signal with a low amplification which is then and subsequent to the amplified signal with the middle amplification output at the output 143 of the read-out circuit 4 as a further output signal. If, in contrast, the comparison shows that the amplified signal with the middle amplification is below the reference value 130, the column amplifier 160 is switched to the high amplification factor to generate a correspondingly amplified signal with a high amplification which is output at the output 143 of the read-out circuit 4.

To switch the amplification factor of the column amplifier 160, the adjustment means 133 is provided which is connected to the output 132 of the comparator 131 which transmits the result of the comparison and which is in turn configured to transmit a corresponding adjustment signal to the column amplifier 160.

Analogously to the image sensor in accordance with FIG. 3a, the image sensor in accordance with FIG. 4a can also have an additional output to output the result of the comparison of the comparator 131 for the signal of a respective pixel toward the outside of the image sensor. Furthermore, the outputs 143 of a plurality of columns or of all the columns of the image sensor in accordance with FIG. 4a can also be coupled to a signal bus as shown in FIG. 3b.

The image sensor in accordance with FIG. 4a compares a signal amplified by the column amplifier 160 with the reference value 130. The image sensor in accordance with FIG. 4b which compares the signal of a respective pixel with a reference value 130 before the respective signal is amplified by the column amplifier 160 differs herein.

Figure 4B:
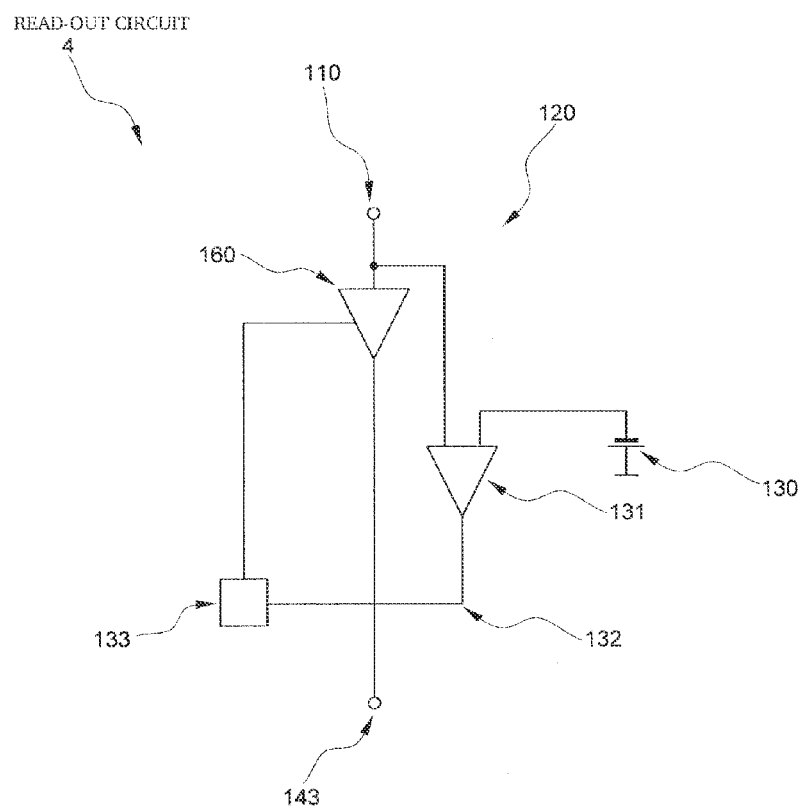
FIG. 4b a third embodiment of a read-out circuit in accordance with the invention.
Figure 5:
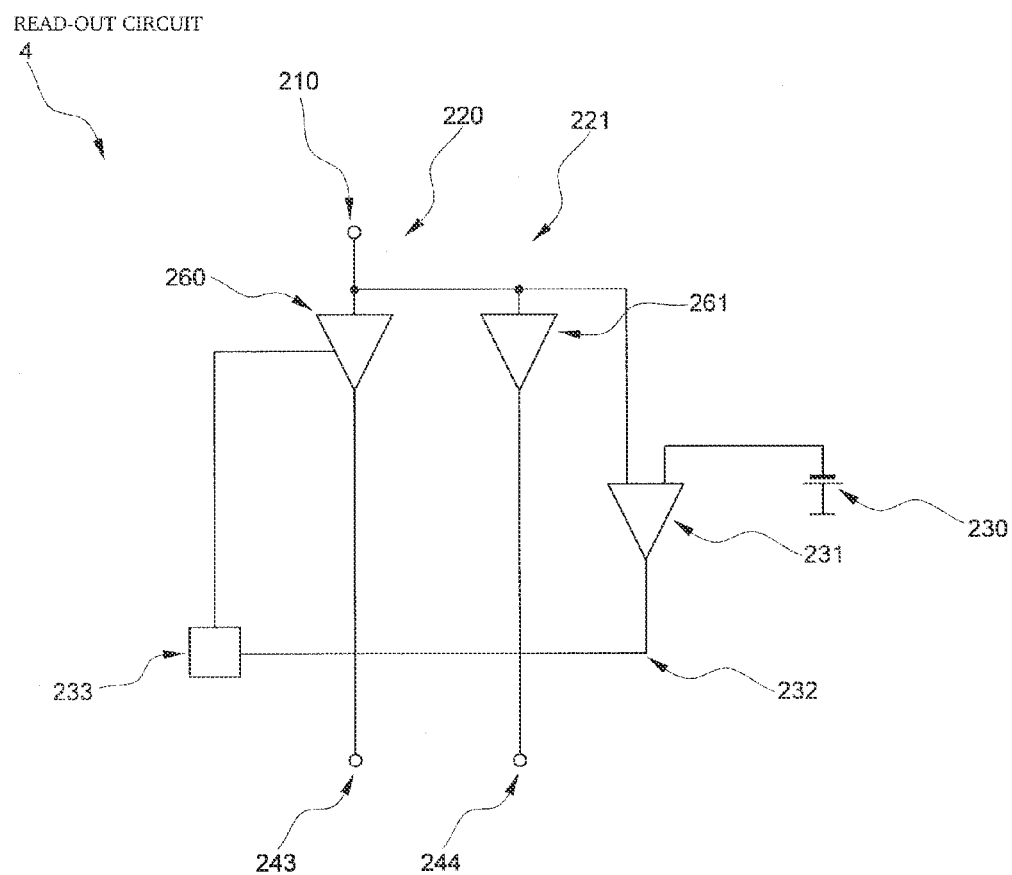
FIG. 5 a fourth embodiment of a read-out circuit in accordance with the invention.

The image sensor in accordance with FIG. 5 is a mixed form of the multichannel image sensors in accordance with FIGS. 3a to 3c and the single-channel image sensors in accordance with FIGS. 4a and 4b.

In the image sensor in accordance with FIG. 5, the read-out circuit 4 includes two channels 220, 221 for each column, with the three aforesaid amplification factors in turn being able to be selected. Each channel 220, 221 includes its own column amplifier 260, 261. The channel 221 amplifies the signal of a respective pixel applied to the input 210 with the middle amplification. The amplified signal of the column amplifier 261 of the channel 221 is output at the channel output 244. The column amplifier 260 of the channel 220 has an adjustable or switchable amplification factor, with the signal amplified by the column amplifier 260 being output at the channel output 243.

To determine whether the signal applied to the input 210 is amplified by the column amplifier 260 with the low or with the high amplification factor, the level of the signal of a respective pixel applied to the input 210 is compared by means of a comparator 231 with a reference value 230. The result of this comparison is in turn supplied to an adjustment means 233 for the adjustment of the amplification of the column amplifier 260, said adjustment means being connected to the output 232 of the comparator 231. If the comparison shows that the signal applied to the input 210 is above the reference value 230, the column amplifier 260 is set to the low amplification factor, otherwise to the high amplification factor.

With respect to the multichannel image sensors in accordance with FIGS. 3a to 3c, the image sensor in accordance with FIG. 5 has the advantage that, instead of three channels with a respective column amplifier, only two channels with a respective column amplifier are required. With respect to the single-channel image sensors in accordance with FIGS. 4a and 4b, the image sensor in accordance with FIG. 5 has the advantage that the two amplified signals to be output at the two channel outputs 243, 244 can be output approximately simultaneously, whereby the read-out speed of the image sensor can be increased.

In FIGS. 3a to 3c, a single common signal of a respective pixel is used for the three channels 20, 21, 22 which is stored, for example, in a respective capacitor of a sample-and-hold stage of the read-out circuit which is connected upstream of the column amplifiers 60, 61, 62, 160 and has a capacitor for the storage of an analog voltage value for each column. The common signal can therefore simultaneously be switched to the channels 20, 21, 22. Equally, only single common signal of a respective pixel can underlie the generation of the amplified signals in the common channel 120 in accordance with FIGS. 4a and 4b or the channels 143, 144 in accordance with FIG. 5.

Alternatively, it is, however, also possible that a plurality of signals are generated from a charge generated in a respective pixel during a single exposure process, said signals subsequently being transferred sequentially to the read-out circuit so that differently high signals of the respective pixel already underlie the different amplifications, but are based on one and the same charge signal, i.e. on one and the same exposure of the pixel. For this purpose, the aforesaid sample-and-hold stage can have a capacitor for each channel such as is known, for example, from US 2005/0052554 A1 and EP 1 681 850 A1 initially named with respect to the prior art. In this respect, it is preferred for a multichannel image sensor if no common input is used for the column amplifier of the channels, deviating from FIGS. 3a to 3c and 5, since otherwise additional switches are required between the common input and the column amplifiers, but rather if the column amplifiers are coupled directly to the respective associated capacitor.

Furthermore, only one single column amplifier input is shown in FIGS. 3a to 3c and FIG. 5 per column amplifier and in the column amplifier in accordance with FIGS. 4a and 4b. The column amplifiers shown are preferably differential amplifiers, with a further column amplifier input with a reference capacitor connected downstream being provided for a correlated double sampling of the pixels of the image sensor for the calculational compensation of the thermal noise per column amplifier.

The advantages of a multiple amplification with different amplification factors can be used in an image sensor by the present invention, with the effort and/or cost required for this purpose simultaneously being able to be kept to a minimum.

Reference Numeral List 1 image sensor
2 pixel
3 row addressing logic
4 read-out circuit
5 column line
6 row selection line
10 input
20 channel with high amplification
21 channel with middle amplification
22 channel with low amplification
30 reference value
31 comparator
32 output of the comparator
33 switch
40 output of the column amplifier 60
41 output of the column amplifier 61
42 output of the column amplifier 62
43 channel output of the read-out circuit
44 channel output of the read-out circuit
45 additional output
51 analog-to-digital converter
52 analog-to-digital converter
53 image sensor output
54 image sensor output
60 column amplifier of the channel 20
61 column amplifier of the channel 21
62 column amplifier of the channel 22
110 input
120 channel
130 reference value
131 comparator
132 output of the comparator
133 adjustment means
143 output of the read-out circuit
160 column amplifier
210 input
220 channel
221 channel
230 reference value
231 comparator
232 output of the comparator
233 adjustment means
243 output of the read-out circuit
244 output of the read-out circuit
260 column amplifier
261 column amplifier

The invention claimed is:

1. An image sensor for electronic cameras, having a plurality of light-sensitive pixels (2) for the generation of at least one signal proportional to exposure, with the pixels (2) being coupled to a read-out circuit (4) which has at least one amplifier (60, 61, 62; 160; 260, 261) and which is configured to amplify the at least one signal of a respective pixel (2) with different amplification factors to generate differently amplified signals for the at least one signal of a respective pixel (2), with the read-out circuit (4) having at least one output (43, 44; 143; 243, 244) to output at least some of the differently amplified signals as output signals,
wherein at least three different amplification factors can be selected for the at least one signal of a respective pixel (2), with the read-out circuit (4) including a selection device (30, 31, 33; 130, 131, 133; 230, 231, 233) which is configured to select, in dependence on a level of the at least one signal of a respective pixel (2), the amplification factors with which the output signals of the read-out circuit (4) are amplified, wherein the number of output signals for the at least one signal of a respective pixel (2) amounts to at least two and is less than the number of the selectable amplification factors.

2. An image sensor in accordance with claim 1, wherein the image sensor (1) includes a plurality of analog-to-digital converters (51, 52) for the digitizing of the output signals output at the at least one output (43, 44; 143; 243, 244), and wherein the selection device (30, 31, 33; 130, 131, 133; 230, 321, 233) includes adjustment means (33; 133; 233) which are arranged between the at least one amplifier (60, 61, 62; 160; 260, 261) and the analog-to-digital converters (51, 52).

3. An image sensor in accordance with claim 1, wherein the generation of the differently amplified signals takes place for the at least one signal of a respective pixel (2) at least partly in mutually separate channels (20, 21, 22; 220, 221) using a respective amplifier (60, 61, 62; 260, 261), with the at least one output (43, 44) including a number of channel outputs (43, 44) corresponding to the number of the selected amplification factors.

4. An image sensor in accordance with claim 3, wherein the read-out circuit (4) is configured such that the amplified signal of at least one of the channels (21) is always output at one of the channel outputs (44) as one of the output signals.

5. An image sensor in accordance with claim 4, wherein the output of the respective output signal of the at least one channel (21; 221) always takes place via the same channel output (44; 244).

6. An image sensor in accordance with claim 3, wherein the channels (20, 21, 22; 220, 221) have different sensitivities.

7. An image sensor in accordance with claim 1, wherein the generation of the differently amplified signals for the at least one signal of a respective pixel (2) takes place at least partly sequentially.

8. An image sensor in accordance with claim 1, wherein the generation of the differently amplified signals for the at least one signal of a respective pixel (2) takes place at least partly in a common channel (120) with a common amplifier (160) of the at least one amplifier, with the amplification factor of the common amplifier (160) being adjustable.

9. An image sensor in accordance with claim 1, wherein the read-out circuit (4) is configured such that the generation of the differently amplified signals for the at least one signal of a respective pixel (2) only takes place for some of the selectable amplification factors.

10. An image sensor in accordance with claim 1, wherein the selection device (30, 31, 33; 130, 131, 133; 230, 231, 233) is configured to carry out the selection in dependence on at least one comparison between at least one reference value (30; 130: 230) and the level of the at least one signal of the respective pixel (2).

11. An image sensor in accordance with claim 10, wherein the selection device is configured to compare the level of the at least one signal of the respective pixel (2) after its amplification with the at least one reference value (30; 130).

12. An image sensor in accordance with claim 1, wherein the selection device (30, 31, 33; 130, 131, 133; 230, 231, 233) includes at least one comparator (31; 131) for each pixel (2) and at least one adjustment means (33; 133; 233).

13. An image sensor in accordance with claim 1, wherein the read-out circuit (4) is configured to select precisely two amplification factors for the at least one signal of a respective pixel (2).

14. An image sensor in accordance with claim 13, wherein precisely three amplification factors can be selected, the three amplification factors including a low amplification factor, a middle amplification factor and a high amplification factor.

15. An image sensor in accordance with claim 14, wherein the read-out circuit (4) is configured to always select the middle amplification factor and to additionally select one of the two other amplification factors.

16. An image sensor in accordance with claim 15, wherein the selection device (30, 31, 33; 130, 131, 133; 230, 231, 232) is configured to compare the amplified signal corresponding to the middle amplification factor or the at least one signal of a respective pixel with a reference value (30; 130; 230), wherein the selection device is further configured to additionally select either the low amplification factor or the high amplification factor if the comparison yields a positive result or a negative result, respectively.

17. An image sensor in accordance with claim 1, wherein the read-out circuit (4) for the at least one signal of a respective pixel (2) includes at least one additional output (45), and wherein the result of the respective selection for the at least one signal of a respective pixel (2) can be output at the at least one additional output (45).

18. An image sensor in accordance with claim 1, wherein the selection device (30, 31, 33; 130, 131, 133) is configured such that the output signals have amplification factors which follow one another directly in a row formed from the selectable amplification factors in rising order.

19. A method for the reading out of an image sensor for electronic cameras, wherein the image sensor (1) includes a plurality of light-sensitive pixels (2) for the generation of at least one signal proportional to exposure, wherein the pixels (2) are coupled to a read-out circuit (4) having at least one amplifier (60, 61, 62; 160), wherein the at least one signal of a respective pixel (2) is amplified with different amplification factors to generate differently amplified signals for the at least one signal of a respective pixel (2), wherein the read-out circuit (4) has at least one output (43, 44; 143) at which at least some of the differently amplified signals are output as output signals,
  wherein at least three different amplification factors can be selected for the at least one signal of a respective pixel (2), wherein the amplification factors with which the output signals of the read-out circuit (4) are amplified are selected in dependence on a level of the at least one signal of a respective pixel (2), wherein the number of output signals for the at least one signal of a respective pixel (2) amounts to at least two and is less than the number of the selectable amplification factors.

* * * * *